United States Patent
Tirumala et al.

(10) Patent No.: US 12,519,827 B2
(45) Date of Patent: Jan. 6, 2026

(54) METHODS FOR DETECTING ICMP FLOOD ATTACKS

(71) Applicant: F5, Inc., Seattle, WA (US)

(72) Inventors: Pradyumana Tirumala, Hyderabad (IN); Satyanarayana Esakonu, Hyderabad (IN); Sailaja Mandalapati, Hyderabad (IN)

(73) Assignee: F5, Inc., Seattle, WA (US)

( * ) Notice: Subject to any disclaimer, the term of this patent is extended or adjusted under 35 U.S.C. 154(b) by 100 days.

(21) Appl. No.: 18/535,371

(22) Filed: Dec. 11, 2023

(65) Prior Publication Data

US 2024/0223601 A1 Jul. 4, 2024

(30) Foreign Application Priority Data

Dec. 30, 2022 (IN) .............................. 202211077021

(51) Int. Cl.
*H04L 9/40* (2022.01)
(52) U.S. Cl.
CPC .............................. *H04L 63/1458* (2013.01)
(58) Field of Classification Search
CPC ................................................. H04L 63/1458
See application file for complete search history.

(56) References Cited

U.S. PATENT DOCUMENTS

| | | | |
|---|---|---|---|
| 4,783,828 A | 11/1988 | Sadjadi | |
| 6,118,893 A | 9/2000 | Li | |
| 6,537,488 B1 | 3/2003 | Okumura et al. | |
| 6,748,056 B1 | 6/2004 | Bapriotti | |
| 6,769,066 B1 | 7/2004 | Botros | |
| 7,228,412 B2 | 6/2007 | Freed | |
| 7,406,606 B2 | 7/2008 | Chawla | |
| 7,441,429 B1 | 10/2008 | Nucci | |
| 7,519,834 B1 | 4/2009 | Dondeti | |
| 7,568,224 B1 | 7/2009 | Jennings | |

(Continued)

FOREIGN PATENT DOCUMENTS

| | | |
|---|---|---|
| CN | 109 391 600 A | 2/2019 |
| CN | 110 365 712 A | 10/2019 |
| WO | WO 02/35860 A1 | 5/2002 |

OTHER PUBLICATIONS

International Search Report dated Mar. 25, 2024 issued in International Application No. PCT/US2023/083393.

(Continued)

*Primary Examiner* — Stephen T Gundry
(74) *Attorney, Agent, or Firm* — Troutman Pepper Locke LLP

(57) ABSTRACT

Methods, non-transitory computer readable media, network traffic manager apparatuses, and systems that assist with detecting a flood attack of a server includes receiving an echo request with a request id for checking connectivity to a server from a source. Next, the method determines whether the request id of the echo request matches a request id of one of a plurality of malicious received requests within a plurality of prior received requests. The comparison of the request ids is conducted to determine whether the request is a legitimate request. Then, the echo request is transmitted to the server when the comparing fails to identify the match. Lastly, an echo response can be sent to the source after sending the echo request to the server.

16 Claims, 9 Drawing Sheets

(56) References Cited

U.S. PATENT DOCUMENTS

| | | |
|---|---|---|
| 7,624,447 B1 | 11/2009 | Horowitz |
| 7,743,415 B2 | 6/2010 | Poletto et al. |
| 8,572,733 B1 | 10/2013 | Rockwood |
| 8,578,482 B1 | 11/2013 | Yang |
| 8,756,684 B2 | 6/2014 | Frantz |
| 8,886,620 B1 | 11/2014 | Mukerji |
| 8,943,588 B1 | 1/2015 | Speegle |
| 9,032,519 B1 | 5/2015 | Maher |
| 9,077,709 B1 | 7/2015 | Dall |
| 9,203,837 B2 | 12/2015 | Pierson |
| 9,578,055 B1 | 2/2017 | Khanal |
| 9,628,499 B1 | 4/2017 | Yu |
| 9,654,485 B1 | 5/2017 | Neumann |
| 9,900,344 B2 | 2/2018 | Smith |
| 9,942,250 B2 | 4/2018 | Stiansen |
| 9,948,629 B2 | 4/2018 | Eisen |
| 9,967,250 B2 | 5/2018 | Johansson |
| 10,050,792 B1 | 8/2018 | Johnson |
| 10,237,298 B1 | 3/2019 | Nguyen |
| 10,397,250 B1 | 8/2019 | Shemesh |
| 10,693,901 B1 | 6/2020 | Chan |
| 11,228,609 B1 | 1/2022 | Finkelshtein |
| 11,336,575 B1 | 5/2022 | Milley et al. |
| 11,968,226 B1* | 4/2024 | Chychi ............... H04L 63/0236 |
| 2002/0116615 A1 | 8/2002 | Nguyen |
| 2003/0042439 A1 | 3/2003 | Rusu |
| 2003/0073091 A1 | 4/2003 | Krylov |
| 2003/0145232 A1 | 7/2003 | Poletto |
| 2003/0199762 A1 | 10/2003 | Fritz |
| 2004/0037326 A1 | 2/2004 | D'souza |
| 2004/0103283 A1 | 5/2004 | Hornak |
| 2004/0170123 A1 | 9/2004 | Carpenter |
| 2005/0027846 A1 | 2/2005 | Nolfe |
| 2005/0111367 A1 | 5/2005 | Jonathan Chao |
| 2005/0195840 A1 | 9/2005 | Krapp |
| 2005/0198519 A1 | 9/2005 | Tamura |
| 2006/0031483 A1 | 2/2006 | Lund |
| 2006/0031928 A1 | 2/2006 | Conley |
| 2007/0014276 A1 | 1/2007 | Bettink |
| 2007/0118894 A1 | 5/2007 | Bhatia |
| 2007/0280114 A1 | 12/2007 | Chao |
| 2007/0294187 A1 | 12/2007 | Scherrer |
| 2008/0028467 A1 | 1/2008 | Kommareddy |
| 2008/0263215 A1 | 10/2008 | Schnellbaecher |
| 2008/0320567 A1 | 12/2008 | Shulman |
| 2009/0024737 A1 | 1/2009 | Goldspink |
| 2009/0199297 A1 | 8/2009 | Jarrett |
| 2010/0031315 A1 | 2/2010 | Feng |
| 2010/0070451 A1 | 3/2010 | Hugues |
| 2010/0284282 A1 | 11/2010 | Solie |
| 2010/0325418 A1 | 12/2010 | Kanekar |
| 2011/0012586 A1 | 1/2011 | Montanar |
| 2011/0072516 A1 | 3/2011 | Cohen |
| 2011/0154026 A1 | 6/2011 | Edstrom |
| 2011/0264905 A1 | 10/2011 | Ovvsiannikov |
| 2012/0051236 A1* | 3/2012 | Hegde ............... H04L 63/1441 370/252 |
| 2012/0079592 A1 | 3/2012 | Pandrangi |
| 2012/0117239 A1 | 5/2012 | Holloway |
| 2012/0144487 A1 | 6/2012 | Kim |
| 2012/0167210 A1 | 6/2012 | Oro |
| 2012/0173710 A1 | 7/2012 | Rodriguez |
| 2012/0227106 A1 | 9/2012 | Shulman |
| 2012/0323700 A1 | 12/2012 | Aleksandrovich |
| 2013/0080407 A1 | 3/2013 | Levow |
| 2013/0263268 A1* | 10/2013 | Kim ............... G06F 21/55 726/23 |
| 2013/0276114 A1 | 10/2013 | Friedrichs |
| 2013/0305365 A1 | 11/2013 | Rubin |
| 2014/0095865 A1 | 4/2014 | Yerra |
| 2014/0289854 A1 | 9/2014 | Mahvi |
| 2014/0298419 A1 | 10/2014 | Boubez |
| 2014/0310805 A1 | 10/2014 | Kandekar |
| 2014/0317739 A1 | 10/2014 | Be'ery |
| 2015/0067328 A1 | 3/2015 | Yin |
| 2015/0088662 A1 | 3/2015 | Moller |
| 2015/0163234 A1 | 6/2015 | Tal |
| 2015/0215334 A1 | 7/2015 | Bingham |
| 2015/0271179 A1 | 9/2015 | Nang |
| 2015/0295945 A1 | 10/2015 | Canzanese |
| 2015/0310196 A1 | 10/2015 | Turgeman |
| 2016/0021084 A1 | 1/2016 | Eisen |
| 2016/0021117 A1 | 1/2016 | Harmon |
| 2016/0127406 A1 | 5/2016 | Smith |
| 2016/0182542 A1 | 6/2016 | Staniford |
| 2016/0337314 A1* | 11/2016 | Yu ...................... H04L 63/0227 |
| 2017/0171231 A1 | 6/2017 | Reybok, Jr. |
| 2017/0249306 A1 | 8/2017 | Alien |
| 2017/0318053 A1 | 11/2017 | Singh |
| 2018/0124073 A1 | 5/2018 | Scherman |
| 2018/0124300 A1 | 5/2018 | Brook |
| 2018/0139228 A1 | 5/2018 | Kanakarajan |
| 2018/0165457 A1 | 6/2018 | Holz |
| 2020/0296125 A1 | 9/2020 | Alderson |
| 2020/0351244 A1 | 11/2020 | Moore |
| 2021/0075790 A1 | 3/2021 | Hebert |
| 2022/0121362 A1 | 4/2022 | Liu et al. |
| 2023/0146962 A1 | 5/2023 | Reddy et al. |
| 2023/0362192 A1* | 11/2023 | Ballew ................... H04L 45/72 |
| 2023/0379405 A1* | 11/2023 | Chhabra ............. H04L 61/2528 |
| 2023/0394138 A1* | 12/2023 | Noeth ................... H04L 43/062 |
| 2023/0421478 A1* | 12/2023 | Chhabra ............. H04L 63/0272 |
| 2024/0073244 A1* | 2/2024 | Duan ................. H04L 63/1466 |
| 2024/0073249 A1* | 2/2024 | Cirello Filho .......... H04L 63/20 |
| 2024/0163094 A1* | 5/2024 | Karas ................... H04L 63/102 |
| 2024/0171484 A1* | 5/2024 | Muñoz De La Torre Alonso ....... H04L 43/062 |
| 2024/0214416 A1* | 6/2024 | Tracy .................. H04L 63/1425 |
| 2024/0236002 A1* | 7/2024 | Huson ................ H04L 47/2441 |
| 2024/0265057 A1* | 8/2024 | Kol ..................... G06F 16/9566 |
| 2024/0283674 A1* | 8/2024 | Konda ................ H04L 12/2809 |
| 2024/0291744 A1* | 8/2024 | Chhabra ................. H04L 69/16 |
| 2024/0291745 A1* | 8/2024 | Chhabra ................. H04L 43/10 |
| 2025/0007835 A1* | 1/2025 | Chhabra ................. H04L 61/00 |
| 2025/0007937 A1* | 1/2025 | Mittal ................ H04L 63/1458 |
| 2025/0039143 A1 | 1/2025 | Parla |
| 2025/0097100 A1 | 3/2025 | Raja |
| 2025/0106254 A1 | 3/2025 | Clark |
| 2025/0106634 A1 | 3/2025 | Sankar Mantha |
| 2025/0126141 A1 | 4/2025 | Uthaman |
| 2025/0148034 A1* | 5/2025 | Shribman ........... H04L 67/1021 |
| 2025/0159039 A1* | 5/2025 | Shribman ........... H04L 67/1021 |
| 2025/0168470 A1 | 5/2025 | Pansare |
| 2025/0175556 A1 | 5/2025 | Meredith |
| 2025/0181420 A1 | 6/2025 | Talavera |
| 2025/0193681 A1 | 6/2025 | Pandit |
| 2025/0203486 A1 | 6/2025 | Karampatsis |

OTHER PUBLICATIONS

BIG-1P® Analytics: Implementations, version 11.3, Nov. 15, 2012, F5 Networks, Inc., pp. 1-40.

F5 Networks, "BIG-1 P Local Traffic Manager: Concepts", version 11.4, pp. 1-178, retrieved from https://support.f5.comkb/en-us/products/bigipltm/manuals/producl/ltm-concepts-11-4-0 .html on Feb. 12, 2015.

F5 Networks, "BIG-1P Local Traffic Manager: Implementations", version 11.4, pp. 1-234, retrieved from https://support.5 .com/kb/en-us/products/bigipltm/manuals/producl/ltm-implementations-11-4-0 .html on Feb. 12, 2015.

F5 Networks, "BIG-1 P Local Traffic Manager: Monitors Reference", version 11.4, pp. 1-106, retrieved from hllps://support. f5 . com/kb/en-us/products/big-ip ltm/manuals/producl/ltm-monitorsreference-11-4-0 .html on Feb. 12, 2015.

F5 Networks, "Operations Guide 1.0 F5 Local Traffic Manager and Global Traffic Manager", pp. 1.144, retrieved from hllps://support. f5 .com/kb/en-us/products/bigipltm/manuals/product/f5-1 tm-gtm-operations-guide-1--0 .html on Feb. 12, 2015.

F5 Networks, "Release Note: BIG-IP L TM and TMOS", version 11.4.1, pp. 1-58, retrieved from hllps://support.f5.com/kb/en-us/products/bigipltm/releasenotes/product/relnote-ltm-11-4-1.html on Feb. 12, 2015.

(56) References Cited

OTHER PUBLICATIONS

F5 Networks, Inc., "BIG-IP Application Security Manager Operations Guide", Manual, Feb. 5, 2016, pp. 1-181, F5 Networks, Inc.
F5 Networks, Inc., "BIG-IP ASM 11.5.0", Release Notes, Apr. 12, 2016, Version 11.5.0.
F5 Networks, Inc., "BIG-IPASM", Release Notes, Jun. 13, 2016, pp. 1-18, version 11.6.1 F5 Networks, Inc.
F5 Networks, Inc., "BIG-IP® Analytics: Implementations", Manual, Jan. 31, 2014, pp. 1-50, Version 11.5.
F5 Networks, Inc., "BIG-IP® Analytics: Implementations", Manual, Aug. 25, 2014, pp. 1-62, v11.6, F5 Networks, Inc.
F5 Networks, Inc., "BIG-IP® Application Security Manager TM: Getting Started", Manual, Aug. 25, 2014, pp. 1-78, version 11.6, F5 Networks, Inc.
F5 Networks, Inc., "BIG-IP® Application Security Manager TM: Implementations", Manual, Aug. 25, 2014, pp. 1-420, version 11.6, F5 Networks, Inc.
F5 Networks, Inc., "BIG-IP® Application Security ManagerTM: Implementations", Manual, Jan. 31, 2014, pp. 1-396, Version 11.5.
F5 Networks, Inc., "BIG-IP® Application Security ManagerTM:Implementations", F5 Networks, Inc., Dec. 10, J014, version 11.6, pp. 1-420.
F5 Networks, Inc., "BIG-IP® Local Traffic Management: Basics", Manual, Aug. 25, 2014, pp. 1-74, version 11.6, F5 Networks, Inc.
F5 Networks, Inc., "BIG-IP® Network Firewall: Policies and Implementations", Manual, Aug. 10, 2016, pp. 1-166, ,11.6, F5 Networks, Inc.
F5 Networks, Inc., "BIG-IP® Systems: DoS Protection and Protocol Firewall Implementations", Manual, Aug. 25, 2014, pp. 1-108, v11.6, F5 Networks, Inc.
F5 Networks, Inc., "BIG-IP® TMOS®: Concepts", Manual, Nov. 11, 2014, pp. 1-148, Version 11.5.
F5 Networks, Inc., "BIG-IP® TMOS®: Implementations", Manual, Jan. 31, 2014, pp. 1-274, Version 11.5.
F5 Networks, Inc., "F5 BIG-IP TMOS: Operations Guide", Manual, Mar. 5, 2015, pp. 1-276 version 11.6, F5 Networks, Inc.
R5 Networks, Inc., "BIG-IP Application Security Manager: Implementations", F5 Networks, Inc., Dec. 10, 2014, version 11.6, pp. 1-420.
F5 Networks, Inc., "BIG-IP® Application Security Manager™: Implementations", Manual, Nov. 10, 2017, pp. 1-348, version 13.0, F5 Networks, Inc.
European Search Report Dated Feb. 17, 2025. European Patent Appln No. 24216113.1.
European Search Report Date Dec. 18, 2024. European Patent Application No. 24193938.8.

* cited by examiner

```
[root@localhost:ModuleNotLicensed::Active:Standalone] config # tcpdump -i any icmp
tcpdump: verbose output suppressed, use -v or -vv for full protocol decode
listening on any, link-type EN10MB (Ethernet), capture size 65535 bytes
00:36:16.498082 IP 10.0.1.2 > 10.0.1.4: ICMP echo request, id 18551, seq 58113, length 8 in slot1/tmm0 lis==
00:36:16.498220 IP 10.0.1.4 > 10.0.1.2: ICMP echo reply,   id 18551, seq 58113, length 8 in slot1/tmm0 lis==
00:36:17.498061 IP 10.0.1.2 > 10.0.1.4: ICMP echo request, id 18551, seq 58369, length 8 in slot1/tmm0 lis==
00:36:17.498246 IP 10.0.1.4 > 10.0.1.2: ICMP echo reply,   id 18551, seq 58369, length 8 in slot1/tmm0 lis==
00:36:18.498055 IP 10.0.1.2 > 10.0.1.4: ICMP echo request, id 18551, seq 58625, length 8 in slot1/tmm0 lis==
00:36:18.498300 IP 10.0.1.4 > 10.0.1.2: ICMP echo reply,   id 18551, seq 58625, length 8 in slot1/tmm0 lis==
00:36:19.498044 IP 10.0.1.2 > 10.0.1.4: ICMP echo request, id 18551, seq 58881, length 8 in slot1/tmm0 lis==
00:36:19.498471 IP 10.0.1.4 > 10.0.1.2: ICMP echo reply,   id 18551, seq 58881, length 8 in slot1/tmm0 lis==
00:36:20.498052 IP 10.0.1.2 > 10.0.1.4: ICMP echo request, id 18551, seq 59137, length 8 in slot1/tmm0 lis==
00:36:20.498298 IP 10.0.1.4 > 10.0.1.2: ICMP echo reply,   id 18551, seq 59137, length 8 in slot1/tmm0 lis==
00:36:21.498038 IP 10.0.1.2 > 10.0.1.4: ICMP echo request, id 18551, seq 59393, length 8 in slot1/tmm0 lis==
00:36:21.498215 IP 10.0.1.4 > 10.0.1.2: ICMP echo reply,   id 18551, seq 59393, length 8 in slot1/tmm0 lis==
00:36:22.498064 IP 10.0.1.2 > 10.0.1.4: ICMP echo request, id 18551, seq 59649, length 8 in slot1/tmm0 lis==
00:36:22.498248 IP 10.0.1.4 > 10.0.1.2: ICMP echo reply,   id 18551, seq 59649, length 8 in slot1/tmm0 lis==
^C
14 packets captured
14 packets received by filter
0 packets dropped by kernel
```

FIG. 5

```
dos_context_type context_name vector_name protocol_type status agg_detected stats stats_rate rate drops drops drops_rate
dropped_bytes_rate hw_offload int_drops int_drops_rate
ba_stats_rate ba_drops ba_drops_rate
Device   Device  ICMPv4 flood Device Ready 0 1960 2 0 0 0 0 0 0 0 0 0
```

FIG. 6

```
00:51:46.329542 IP 10.0.1.2 > 10.0.1.4: ICMP echo request, id 16760, seq 9214,  length 8 in slot1/tmm6 lis=
00:51:46.329559 IP 10.0.1.2 > 10.0.1.4: ICMP echo request, id 16760, seq 9470,  length 8 in slot1/tmm6 lis=
00:51:46.329577 IP 10.0.1.2 > 10.0.1.4: ICMP echo request, id 16760, seq 9726,  length 8 in slot1/tmm6 lis=
00:51:46.329596 IP 10.0.1.2 > 10.0.1.4: ICMP echo request, id 16760, seq 9982,  length 8 in slot1/tmm6 lis=
00:51:46.329613 IP 10.0.1.2 > 10.0.1.4: ICMP echo request, id 16760, seq 10238, length 8 in slot1/tmm6 lis=
00:51:46.329632 IP 10.0.1.4 > 10.0.1.2: ICMP echo reply,   id 16760, seq 42239, length 8 in slot1/tmm6 lis=
00:51:46.330817 IP 10.0.1.2 > 10.0.1.4: ICMP echo request, id 16760, seq 44543, length 8 in slot1/tmm6 lis=
00:51:46.330838 IP 10.0.1.4 > 10.0.1.2: ICMP echo reply,   id 16760, seq 42495, length 8 in slot1/tmm6 lis=
00:51:46.330855 IP 10.0.1.2 > 10.0.1.4: ICMP echo request, id 16760, seq 44799, length 8 in slot1/tmm6 lis=
00:51:46.330874 IP 10.0.1.4 > 10.0.1.2: ICMP echo reply,   id 16760, seq 42751, length 8 in slot1/tmm6 lis=
00:51:46.330892 IP 10.0.1.2 > 10.0.1.4: ICMP echo request, id 16760, seq 45055, length 8 in slot1/tmm6 lis=
00:51:46.330910 IP 10.0.1.4 > 10.0.1.2: ICMP echo reply,   id 16760, seq 43007, length 8 in slot1/tmm6 lis=
00:51:46.330927 IP 10.0.1.4 > 10.0.1.2: ICMP echo reply,   id 16760, seq 43263, length 8 in slot1/tmm6 lis=
00:51:46.330944 IP 10.0.1.2 > 10.0.1.4: ICMP echo request, id 16760, seq 45311, length 8 in slot1/tmm6 lis=
00:51:46.330963 IP 10.0.1.4 > 10.0.1.2: ICMP echo reply,   id 16760, seq 43519, length 8 in slot1/tmm6 lis=
00:51:46.330981 IP 10.0.1.2 > 10.0.1.4: ICMP echo request, id 16760, seq 45567, length 8 in slot1/tmm6 lis=
00:51:46.330999 IP 10.0.1.2 > 10.0.1.4: ICMP echo request, id 16760, seq 45823, length 8 in slot1/tmm6 lis=
00:51:46.331023 IP 10.0.1.2 > 10.0.1.4: ICMP echo request, id 16760, seq 46079, length 8 in slot1/tmm6 lis=
00:51:46.331043 IP 10.0.1.2 > 10.0.1.4: ICMP echo request, id 16760, seq 46335, length 8 in slot1/tmm6 lis=
00:51:46.331061 IP 10.0.1.2 > 10.0.1.4: ICMP echo request, id 16760, seq 46591, length 8 in slot1/tmm6 lis=
00:51:46.331080 IP 10.0.1.2 > 10.0.1.4: ICMP echo request, id 16760, seq 46847, length 8 in slot1/tmm6 lis=
00:51:46.331098 IP 10.0.1.2 > 10.0.1.4: ICMP echo request, id 16760, seq 47103, length 8 in slot1/tmm6 lis=
00:51:46.331116 IP 10.0.1.2 > 10.0.1.4: ICMP echo request, id 16760, seq 47359, length 8 in slot1/tmm6 lis=
00:51:46.331134 IP 10.0.1.2 > 10.0.1.4: ICMP echo request, id 16760, seq 47615, length 8 in slot1/tmm6 lis=
^C
```

FIG. 7

| Dos_context_type | Context_name | Vector_name | Protocol_type | status | Agg_detected | status | Drops | drops_rate | dropped_bytes_rate | hw_off | int_drops | int_drops_rate |
|---|---|---|---|---|---|---|---|---|---|---|---|---|
| Device | Device | /Common/dos-common/Sig_34382_4_1656319163 | L4 BDoS | Ready | 1 | 14853729 | 0 | 0 | 0 | 1 | 14655420 | 0 |
| Device | Device | /Common/dos-common/Sig_34382_5_1656319163 | L4 BDoS | Ready | 1 | 198280 | 0 | 0 | 0 | 1 | 229200 | 0 |
| Device | Device | ICMPv4 flood | Device | Ready | 0 | 21423207 | 0 | 0 | 0 | 0 | 0 | 0 |

| Dos_context_type | Context_name | Vector_name | Protocol_type | status | Agg_detected | status | Drops | drops_rate | dropped_bytes_rate | hw_off |
|---|---|---|---|---|---|---|---|---|---|---|
| Device | Device | /Common/dos-common/sig_34382_4_1656319163 | L4 BDoS | Ready | 1 | 46509214 | 257062 | 0 | 0 | 1 |
| Device | Device | /Common/dos-common/sig_34382_5_1656319163 | L4 BDoS | Ready | 1 | 271244 | 0 | 0 | 0 | 0 |
| Device | Device | ICMPv4 flood | Device | Ready | 0 | 21575664 | 0 | 0 | 0 | 0 |

| int_drops | int_drops_rate |
|---|---|
| 46270270 | 56991 |
| 0 | 0 |
| 0 | |

METHODS FOR DETECTING ICMP FLOOD ATTACKS

CROSS-REFERENCE TO RELATED APPLICATIONS

This application claims priority to Indian Patent Application No. 202211077021, filed on Dec. 30, 2022, which is hereby incorporated by reference in its entirety.

FIELD

This technology relates to methods and systems for detecting an internet control message protocol flood attack of a server.

BACKGROUND

In order to halt an internet control message protocol ("ICMP") flood attack of a server, a server needs to detect the flood attack and drop any malicious requests related to the flood attack. An ICMP flood attack is a type of distributed denial of service ("DDoS") attack where a system is flooded with requests to disable the system. A system can be flooded with ICMP pings such as echo requests. For every echo request received, a system typically responds with an echo reply message. When a system is flooded with echo requests, the system may become inaccessible to normal traffic or become unresponsive to legitimate ping requests.

To prevent the flood attack of a server, a server or network traffic management system can simply drop received requests in a plurality of requests by setting a limit on the number of echo requests the network will receive. For example, the limit can be set based on a packet per second threshold. In other words, the network can set a number of requests that it will accept per second, and any additional requests received over the number will be automatically dropped. Unfortunately, the problem with simply setting a limit on requests is that the system may drop legitimate traffic along with the malicious traffic resulting in unnecessary delays and an undesirable user experience.

SUMMARY

A method for detecting a flood attack of a server, implemented in cooperation with a cloud service or a network traffic management system comprising one or more network traffic management modules, server modules, or client modules, includes receiving an echo request with a request id for checking connectivity to a server from a source. Next, the method determines whether the request id of the echo request matches a request id of one of a plurality of malicious received requests within a plurality of prior received requests. The comparison of the request ids is conducted to determine whether the request is a legitimate request. Then, the echo request is transmitted to the server when the comparing fails to identify the match. Lastly, an echo response can be sent to the source after sending the echo request to the server.

A network traffic management apparatus including memory including programmed instructions stored thereon and one or more processors configured to be capable of executing the stored programmed instructions to receive an echo request with a request id for checking connectivity to a server from a source. Next, the network traffic manager determines whether the request id of the echo request matches a request id of one of a plurality of malicious received requests within a plurality of prior received requests. The comparison of the request ids is conducted to determine whether the request is a legitimate request. Then, the echo request is transmitted to the server when the comparing fails to identify the match. Lastly, an echo response can be sent to the source after sending the echo request to the server.

A non-transitory computer readable medium having stored thereon instructions for including executable code that, when executed by one or more processors, causes the processors to receive an echo request with a request id for checking connectivity to a server from a source. Next, the network traffic manager determines whether the request id of the echo request matches a request id of one of a plurality of malicious received requests within a plurality of prior received requests. The comparison of the request ids is conducted to determine whether the request is a legitimate request. Then, the echo request is transmitted to the server when the comparing fails to identify the match. Lastly, an echo response can be sent to the source after sending the echo request to the server.

A network traffic management system includes one or more traffic management modules, server modules, or client modules, memory comprising programmed instructions stored thereon, and one or more processors configured to be capable of executing the stored programmed instructions to receive an echo request with a request id for checking connectivity to a server from a source. Next, the network traffic manager determines whether the request id of the echo request matches a request id of one of a plurality of malicious received requests within a plurality of prior received requests. The comparison of the request ids is conducted to determine whether the request is a legitimate request. Then, the echo request is transmitted to the server when the comparing fails to identify the match. Lastly, an echo response can be sent to the source after sending the echo request to the server.

This technology provides a number of advantages including providing methods, non-transitory computer readable media, network traffic management apparatuses, and network traffic management systems that more effectively managing a response to a flood attack by effectively identifying which particular requests are malicious and should be dropped to avoid affecting legitimate traffic. Examples of this technology are able to achieve this level of accuracy and efficiency by, utilizing a request id in each received request to increase the efficiency of detecting which particular requests are malicious while maintaining throughput.

BRIEF DESCRIPTION OF THE DRAWINGS

FIG. 5 is an exemplary image illustrating legitimate traffic directed to a destination;

FIG. 6 is an exemplary image illustrating ICMP statistics of legitimate traffic directed to a destination;

FIG. 7 is an exemplary image illustrating attack traffic directed to a destination;

FIG. 8 is an exemplary image illustrating a detected flood attack of a destination; and FIG. 9 is an exemplary image illustrating stopping a flood attack.

DETAILED DESCRIPTION

Figure 1:
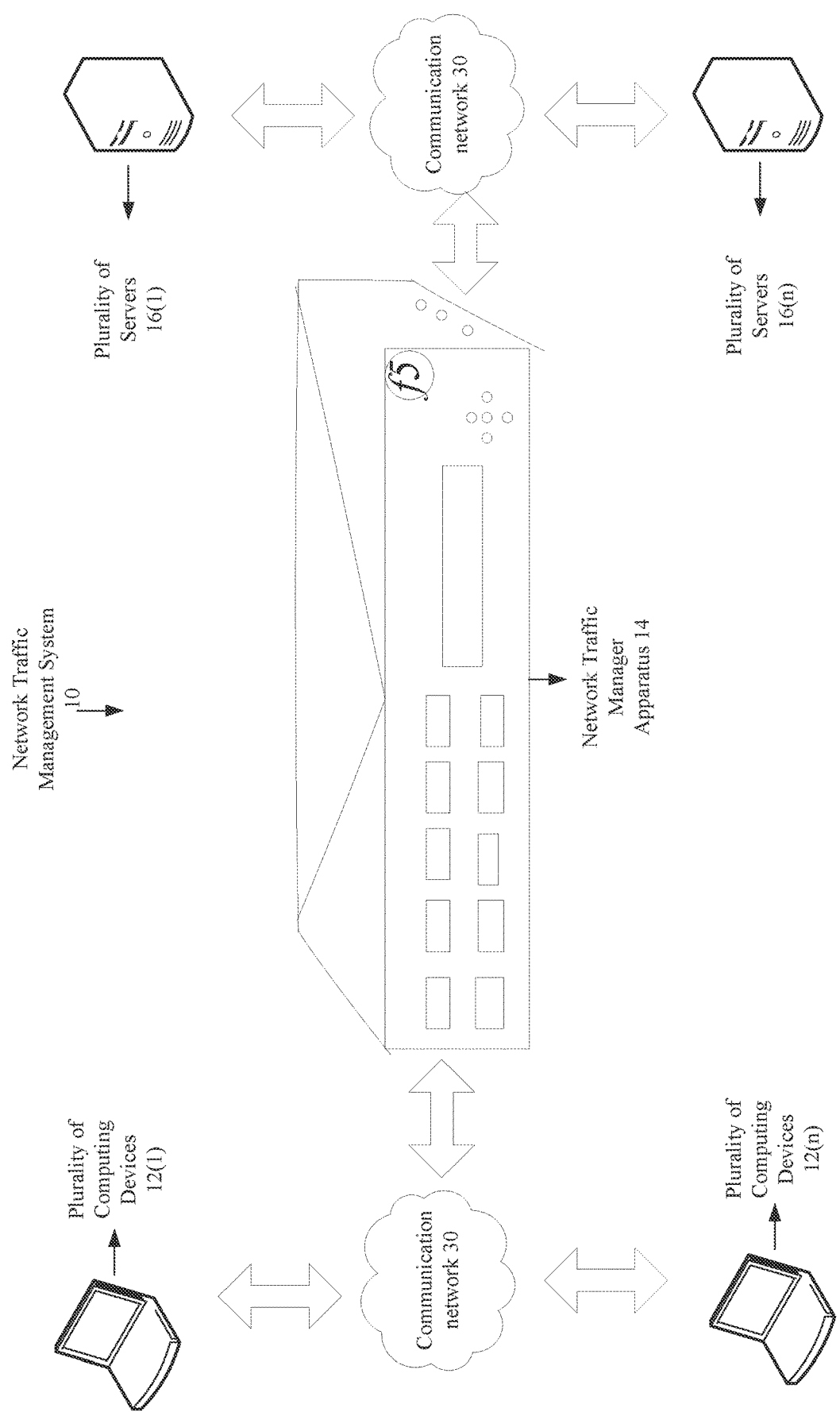
FIG. 1 is block diagrams of an exemplary network traffic management system with a network traffic management apparatus.

An example of a network environment 10 which incorporates a network traffic management system detecting a flood attack of a server with the network traffic manager apparatus 14 is illustrated in FIG. 1. The exemplary environment includes a plurality of computing devices 12(1)-12(n), a network traffic manager apparatus 14, and a plurality of servers 16(1)-16(n) which are coupled together by communication networks 30, although the environment can include other types and numbers of systems, devices, components, and/or elements and in other topologies and deployments. This technology provides a number of advantages including more effectively managing a response to a flood attack by effectively identifying which particular requests are malicious and should be dropped to avoid affecting legitimate traffic.

Referring more specifically to FIG. 1, the network traffic manager apparatus 14 of the network traffic management system is coupled to the plurality of computing devices 12(1)-12(n) through the communication network 30, although the plurality of computing devices 12(1)-12(n) and network traffic manager apparatus 14 may be coupled together via other topologies. Additionally, the network traffic manager apparatus 14 is coupled to the plurality of servers 16(1)-16(n) through the communication network 30, although the plurality of servers 16(1)-16(n) and the network traffic manager apparatus 14 may be coupled together via other topologies. While not shown, the exemplary environment may include additional network components, such as routers, switches and other devices, which are well known to those of ordinary skill in the art and thus will not be described here. The communication network 30 can be a wide area network (WAN) or a local area network (LAN). Other network devices configured to generate, send, and receive network communications can be used.

The network traffic manager apparatus 14 assists with detecting a flood attack as illustrated and described by way of the examples herein, although the network traffic manager apparatus 14 may perform other types and/or numbers of functions. As an example, the network traffic manager apparatus 14 may perform optimizing, securing, and accelerating the network traffic between the computing devices 12(1)-12(n) and the plurality of servers 16(1)-16(n). The network traffic manager apparatus 14 includes at least one processor or central processing unit (CPU), memory, and a communication system which are coupled together by a bus device although the network traffic manager apparatus 14 may comprise other types and numbers of elements in other configurations. In this example, the bus is a PCI Express bus in this example, although other bus types and links may be used.

Each of the computing devices 12(1)-12(n) and each of the plurality of servers 16(1)-16(n) include a central processing unit (CPU) or processor, a memory 22, an interface device, and an I/O system, which are coupled together by a bus or other link, although other numbers and types of network devices could be used. The computing devices 12(1)-12(n) may run interface applications that may provide an interface to make requests for and send content and/or data to applications or services provided by the server computing devices 20(1)-20(n) via the communication network 30, LANs and/or WAN using the network traffic manager apparatus 14. The computing devices 12(1)-12(n) can be controlled by malicious players who send malicious requests. The computing devices 12(1)-12(n) can also be controlled by legitimate players who send valid requests.

The processors within the network traffic manager apparatus 14 may execute one or more computer-executable instructions stored in memory for the methods illustrated and described with reference to the examples herein, although the processor can execute other types and numbers of instructions and perform other types and numbers of operations. The processor may comprise one or more central processing units ("CPUs") or general purpose processors with one or more processing cores, such as AMD® processor(s), although other types of processor(s) could be used (e.g., Intel®).

Figure 2:
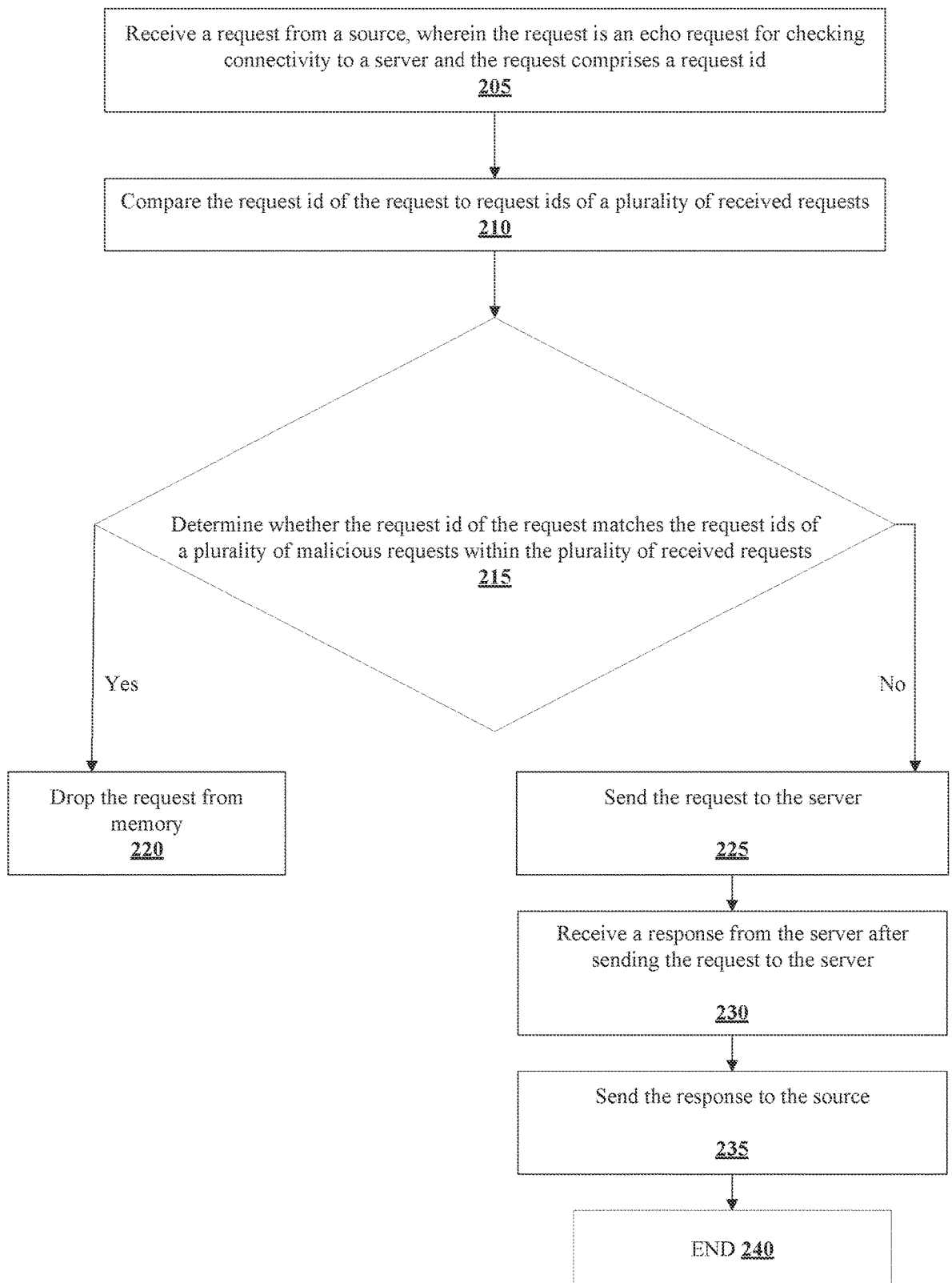
FIG. 2 is a flowchart of an exemplary method for detecting a flood attack of a server.
Figure 3:
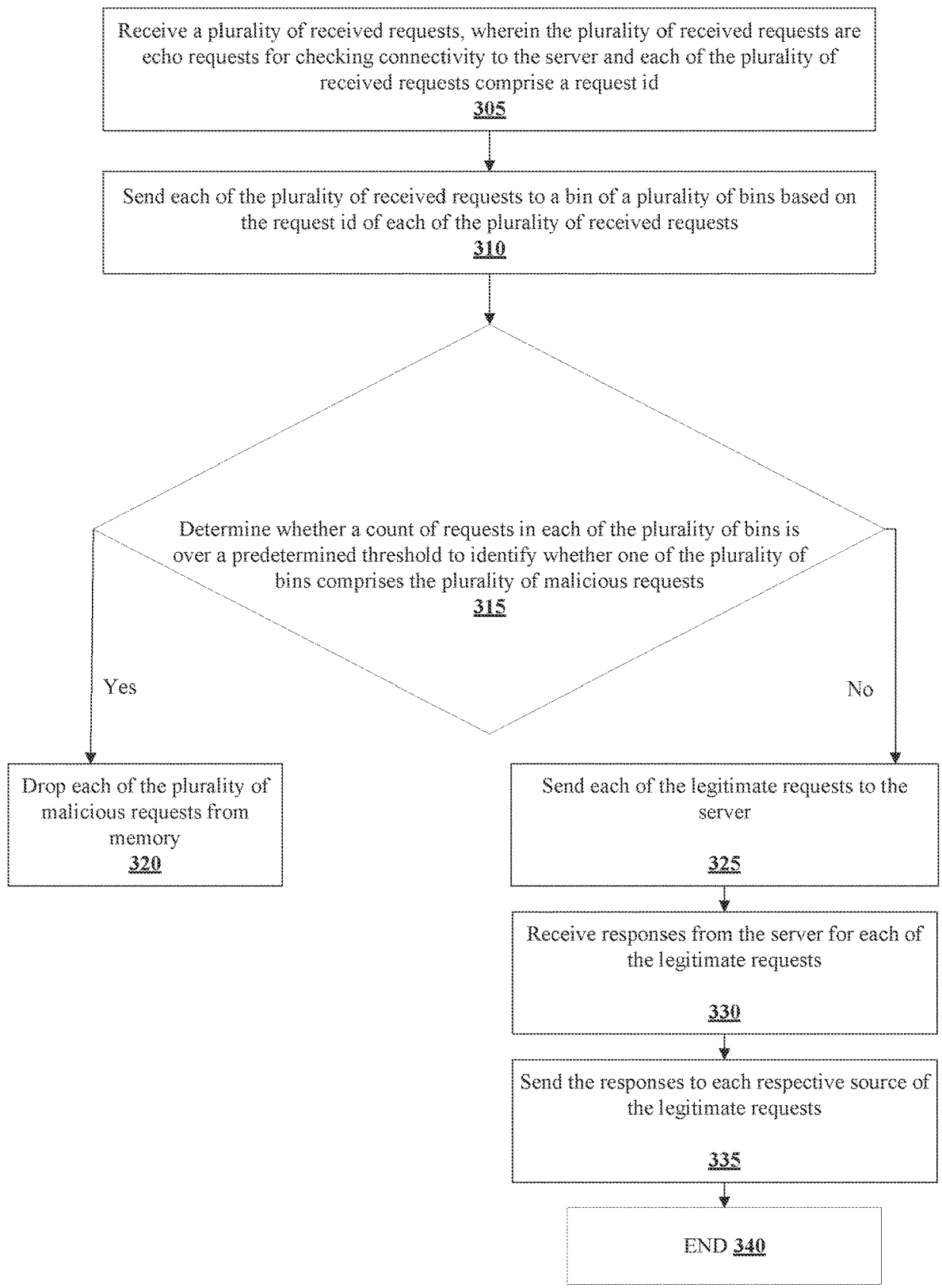
FIG. 3 is a flowchart of an exemplary method for detecting a flood attack of a server.
Figure 4:
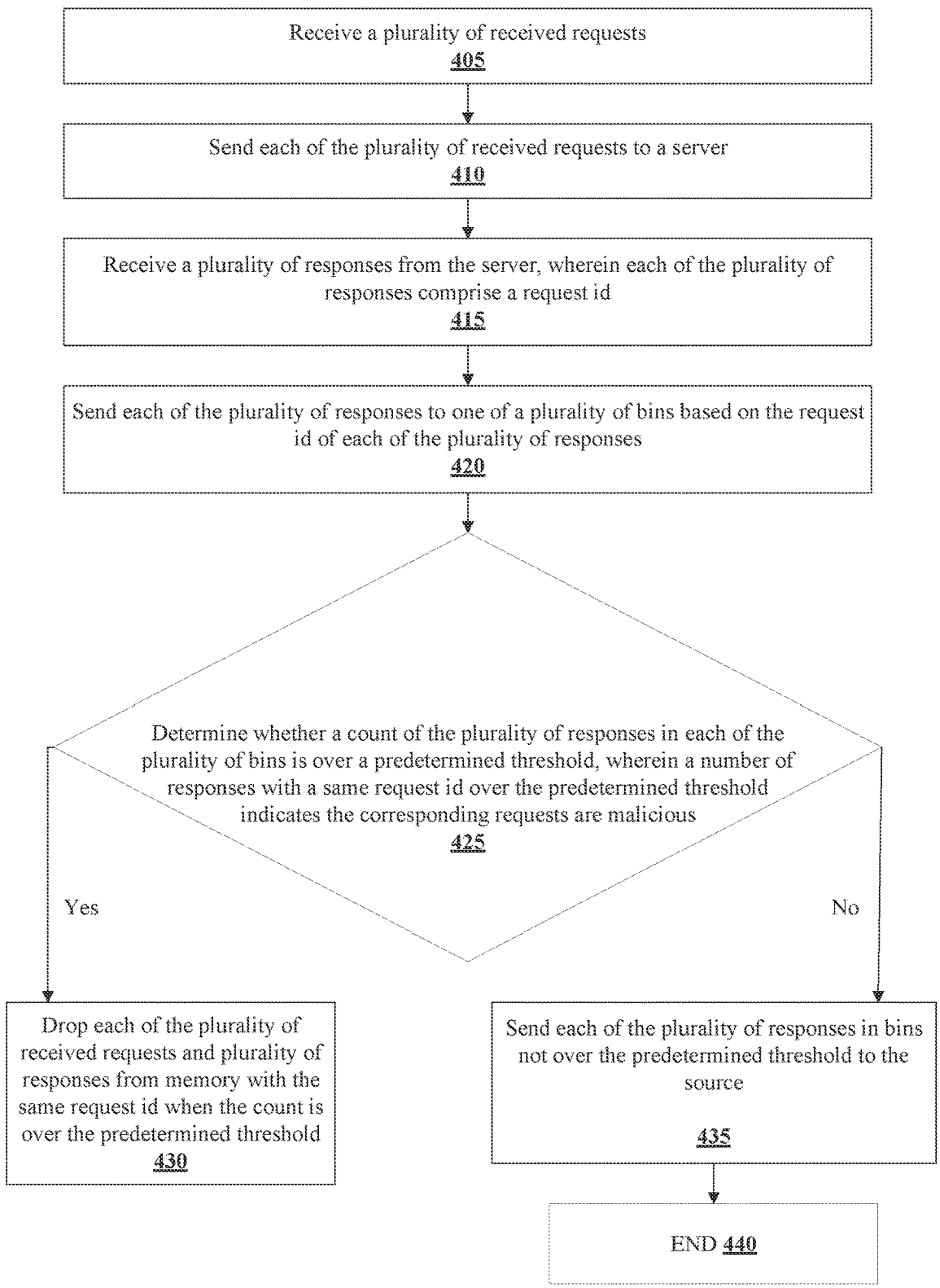
FIG. 4 is a flowchart of an exemplary method for detecting a flood attack of a server.

The memory within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory may store one or more non-transitory computer-readable instructions of this technology as illustrated and described with reference to the examples herein that may be executed by the processor. The exemplary flowchart shown in FIGS. 2 through 4 are representative of example steps or actions of this technology that may be embodied or expressed as one or more non-transitory computer or machine readable instructions stored in the memory that may be executed by the processor.

Accordingly, the memory of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIGS. 2 and 3. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various examples, virtual machine(s) running on the network traffic manager apparatus 14 may be managed or supervised by a hypervisor.

The communication system in the network traffic manager apparatus 14 is used to operatively couple and communicate between the network traffic manager apparatus 14, the plurality of computing devices 12(1)-12(n), and the plurality of servers 16(1)-16(n) which are all coupled together by communication network 30 such as one or more local area networks (LAN) and/or the wide area network (WAN), although other types and numbers of communication networks 30 or systems with other types and numbers of connections and configurations to other devices and elements may be used. By way of example only, the communication network 30 such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus is a PCI Express bus in this example, although other bus types and links may be used. The LANs in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The WAN may comprise any wide area network (e.g., Internet), although any other type of traffic network topology may be used.

Each of the plurality of computing devices 12(1)-12(n) of the network traffic management system 10, include a central processing unit (CPU) or processor, a memory, input/display device interface, and an input/output system or I/O system, which are coupled together by a bus or other link. The plurality of computing devices 12(1)-12(n), in this example, may run interface applications that may provide an interface to make requests for and send and/or receive data to and/or from the plurality of servers 16(1)-16(n) via the network traffic manager apparatus 14. Additionally, the plurality of computing devices 12(1)-12(n) can include any type of computing device that can receive, render, and facilitate user interaction, such as client computers, network computer, mobile computers, mobile phones, virtual machines (including cloud-based computer), or the like. Each of the plurality of computing devices 12(1)-12(n) utilizes the network traffic manager apparatus 14 to conduct one or more operations with the plurality of servers 16(1)-16(n). Each of the plurality of computing devices 12(1)-12(n) of the network traffic management system 10 can send requests to the network traffic manager apparatus 14 or to the plurality of servers 16(1)-16(n). The requests sent by the plurality of computing devices 12(1)-12(n) can be echo requests. Echo requests can be sent to see if the network traffic manager apparatus 14 or to the plurality of servers 16(1)-16(n) are online or functional. The sources of the echo requests can be client computing devices or unknown computing devices.

Each of the plurality of servers 16(1)-16(n) of the network traffic management system include a central processing unit (CPU) or processor, a memory, and a communication system, which are coupled together by a bus or other link, although other numbers and/or types of network devices could be used. Generally, the plurality of servers 16(1)-16(n) process requests for providing access to one or more applications received from the plurality of client computing devices 12(1)-12(n), network traffic manager apparatus 14, via the communication network 30, but the principles discussed herein are not limited to this example and can include other protocols. A series of applications may run on the servers 16(1)-16(n) that allows the transmission of responses requested by the plurality of client computing devices 12(1)-12(n), or the network traffic manager apparatus 14. The plurality of servers 16(1)-16(n) may provide data or receive data in response to requests directed toward the respective applications on the plurality servers 16(1)-16(n) from the plurality of client computing devices 12(1)-12(n) or the network traffic manager apparatus 14. When the plurality of servers 16(1)-16(n) receives an echo request, the plurality of servers 16(1)-16(n) are required to respond with an echo reply query message according to the requirements for internet hosts ("RFC") 1122. All data received in an ICMP echo request must be entirely included in the resulting echo reply. When the plurality of servers 16(1)-16(n) receive overwhelming ICMP requests, the CPU of the plurality of servers 16(1)-16(n) can begin dropping ICMP requests. The plurality of servers 16(1)-16(n) can also set limits to the rate of received ICMP traffic and drop any requests above the rate limit when the plurality of servers 16(1)-16(n) are overwhelmed ICMP requests.

Although the plurality of servers 16(1)-16(n) are illustrated as single servers, each of the plurality of servers 16(1)-16(n) may be distributed across one or more distinct network computing devices. Moreover, the plurality of servers 16(1)-16(n) are not limited to a particular configuration. Thus, the plurality of servers 16(1)-16(n) may contain a plurality of network computing devices that operate using a master/slave approach, whereby one of the network computing devices of the plurality of servers 16(1)-16(n) operate to manage and/or otherwise coordinate operations of the other network computing devices. The plurality of servers 16(1)-16(n) may operate as a plurality of network computing devices within cluster architecture, a peer-to peer architecture, virtual machines, or within a cloud architecture. It is to be understood that the plurality of servers 16(1)-16(n) may be hardware or software or may represent a system with multiple external resource servers, which may include internal or external networks.

Thus, the technology disclosed herein is not to be construed as being limited to a single environment and other configurations and architectures are also envisaged. For example, the one or more of the plurality of servers 16(1)-16(n) depicted in FIG. 1 can operate within network traffic manager apparatus 14 rather than as a standalone server communicating with network traffic manager apparatus 14 via the communication network(s) 30. In this example the plurality of servers 16(1)-16(n) operate within the memory of the network traffic manager apparatus 14.

While the network traffic manager apparatus 14 is illustrated in this example as including a single device, the network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, plurality of servers 16(1)-16(n) or, the network traffic manager apparatus 14, or applications coupled to the communication network(s) 30, for example. Moreover, one or more of the devices of the network traffic manager apparatus 14 in these examples can be in a same or a different communication network 30 including one or more public, private, or cloud networks, for example.

Although an exemplary network traffic management system 10 with the plurality of computing devices 12(1)-12(n), the network traffic manager apparatus 14, and the plurality of servers 16(1)-16(n), communication networks 30, LANS, WAN, are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14, the plurality of computing devices 12(1)-12(n), the plurality of servers 16(1)-16(n), for example, may be configured to operate as virtual instances on the same physical machine. In other words, one or more of network traffic manager apparatus 14, the plurality of computing devices 12(1)-12(n), or the plurality of servers 16(1)-16(n) illustrated in FIG. 1 may operate on the same physical device rather than as separate devices communicating through a network as depicted in FIG. 1. There may be more or fewer plurality of computing devices 12(1)-12(n), network traffic manager apparatus 14, or the plurality of servers 16(1)-16(n) than depicted in FIG. 1. The plurality of computing devices 12(1)-12(n), the plurality of servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for detecting a flood attack of a server 16(1) will now be described with reference to FIGS. 2 through 9. First in step 205, the network traffic manager apparatus 14 receives an echo request with a request id from a source. The source can be a legitimate client using one of the plurality of computing devices 12(1)-12(n) or the source can be a malicious actor. An echo request is generally used for checking connectivity to a server 16(1). The echo request can comprise data, such as a source address, a destination address, an echo request type, a request id, a packet size, flags, protocol, a code, a checksum, a sequence number, optional data, and other data known in the art. A request id can be a unique identifier for a source sending requests to the network traffic manager apparatus 14. Different requests with the same request id indicate that the different requests came from the same source. Echo requests are sent between the client computing device 12(1) and the network traffic manager apparatus 14, then from the network traffic manager apparatus 14 to the server 16(1) to prevent ICMP flood attacks. In this example, the proxy may be a third-party interposed between one of the plurality of computing devices 12(1)-12(n) and one of the plurality of servers 16(1)-16(n) (or network traffic manager apparatus 14). As each of the echo requests are forwarded through the proxy, the network traffic manager apparatus 14 in this example, then the proxy may extract data from the echo requests to more effectively manage the flood attack. The extracted data from the echo requests can be compared to data in malicious requests to determine if the echo request should be processed. In some examples, the server 16(1) can use this method of comparing data in echo requests to data from malicious requests before processing the echo request to stop the flood attack.

In step 210, the network traffic manager apparatus 14 determines whether the request id of the echo request matches a request id of one of a plurality of malicious received requests within a plurality of prior received requests. If the network traffic manager apparatus 14 determines the request id of the echo request matches the request ids of the plurality of malicious requests within the plurality of received requests, then the Yes branch is taken to step 215. If the network traffic manager apparatus 14 determines the request id of the echo request does not match the request ids of the plurality of malicious requests, then the No branch is taken to step 220. In order to determine whether the request id of the echo request matches a request id of one of a plurality of malicious received requests, the network traffic manager apparatus 14 must first identify the plurality of malicious received requests within the plurality of prior received requests. Once the plurality of malicious received requests is identified, then the request id for any subsequent received echo requests, such as the echo request in this example, can be compared to the request ids of the plurality of malicious received requests to determine if any of the subsequent received echo requests are malicious and a part of the flood attack.

To identify the plurality of malicious received requests, it is essential to have a count of received requests from a same source. A source can send a plurality of requests to the network traffic manager apparatus 14. A malicious actor can also send a plurality of malicious requests to the network traffic manager apparatus 14. In a flood attack, a malicious actor will send a high number of malicious requests so that the network traffic manager apparatus 14 or server 16(1) cannot process all of the requests. The high number of malicious requests can cause a network to drop requests and can make the network unavailable to legitimate traffic. An abnormally high count of requests from the same source sent to the network traffic manager apparatus 14 or the server 16(1) can indicate that the requests are a plurality of malicious requests.

To count the number of requests from the same source, a hashing algorithm can be used by the network traffic manager apparatus 14 to first sort the plurality of received requests by their request ids. The hashing algorithm can be known algorithms in the art that can iterate through the plurality of received requests based on each of their respective request ids. In some examples, the hashing algorithm can also iterate through the plurality of received requests based on the source address of the plurality of received requests to sort the plurality of received requests. To help facilitate the counting of the plurality of received requests by request ids, the plurality of received requests with the same request id can be sent by the hashing algorithm to a bin to later be counted. A bin can keep track of aggregated traffic in a network. When a request is added to a bin, the bin will store or keep track of the request in memory. Separating the plurality of received requests into bins can make it easy to count the number of requests from the same source. For example, the plurality of received requests are sorted into bins based on the request ids of the plurality of received requests. Then the network traffic manager apparatus 14 can iterate through the requests in each bin to count the number of requests in each bin to determine how many requests came from different sources.

Thus, in this example, the network traffic manager apparatus 14 can first sort the plurality of received requests into a plurality of bins based on the request id of each of the plurality of received requests. After the plurality of received requests are sorted into the plurality of bins, the network traffic manager apparatus 14 can determine if one of the plurality of bins contains a plurality of malicious requests by counting the number of requests in each of the plurality of bins and comparing the number of requests in each of the plurality of bins to a predetermined threshold.

As mentioned above, during the flood attack on the server 16(1), a malicious actor may attempt to send the plurality of malicious requests to the server 16(1) without waiting for a response from the server 16(1). This can be done to slow the response of the server 16(1) and to thereby block legitimate traffic to the server 16(1). The plurality of malicious requests usually will have a high count of requests in order to create the flood attack. As illustrated in the exemplary images in FIGS. 4 and 5, legitimate traffic directed to a server 16(1) does not contain a high count of requests from a source. However, as illustrated in the exemplary images in FIGS. 5 through 9, a flood attack comprise a high count of requests and results in multiple requests being dropped. By setting a predetermined threshold and checking whether the count of requests from a source with the same request id is greater than the threshold, the network traffic manager apparatus 14 is able to successfully detect the flood attack. Therefore, a bin of the plurality of bins with a count over the predetermined threshold can be identified as a bin holding the plurality of malicious requests.

The predetermined threshold can be set to different values after comparing the volume of malicious requests used in historical flood attacks. Other methods known in the art can be used to set the predetermined threshold, such as analyzing historical flood attacks and future flood attacks to determine a minimum threshold of malicious requests that malicious actors use to implement the flood attack. Once the bin with the plurality of malicious requests is identified, the network traffic manager apparatus 14 can compare the request id of the request to see if it matches the request ids of the plurality of malicious requests.

In step 215, if the request id of the echo request matches the request ids of a plurality of malicious requests within the plurality of received requests, the network traffic manager apparatus 14 drops the request from memory. In this example, the network traffic manager apparatus 14 can simply not send the request to the server 16(1) so that a response is not generated by the server 16(1), and thus eliminating the threat. By eliminating the processing of the request and the generation of a response, the flood attack can be effectively mitigated.

In step 220, if the request id of the echo request does not match the request ids of a plurality of malicious requests within the plurality of received requests, the network traffic manager apparatus 14 sends the echo request to the server 16(1). The network traffic manager apparatus 14 can send the echo request to the server 16(1) because if the request id of the echo request does not match the request ids of the plurality of malicious requests, then that indicates that the request is a legitimate request. The plurality of servers 16(1)-16(n) are required to respond with an echo reply query message according to the requirements for internet hosts ("RFC") 1122. Therefore, the request is sent to the server 16(1) so that the server 16(1) can generate a response to the request. The response can be an echo reply or response. Then in step 230, the network traffic manager apparatus 14 receives the response from the server 16(1).

In step 230, the network traffic manager apparatus 14 sends the response to the source and the exemplary process ends at step 240. The response will comprise of all the data received in the request as required by RFC 1122 requirements. Additionally, as mentioned above, the request comprises the source address. The network traffic manager apparatus 14 can use the source address in the request to send the response from the server 16(1) to the source. After the source receives the response generated from the server 16(1), the exemplary process ends and any flood attacks of the server 16(1) are successfully mitigated.

By example, the method for detecting a flood attack on a server 16(1) will now be described with reference to FIGS. 3 through 9. First in step 305, the network traffic manager apparatus 14 can receive a plurality of received requests. The plurality of received requests can be echo requests for checking connectivity to the server and each of the plurality of received requests can comprise a request id. As highlighted above in step 205, the plurality of received requests can further comprise data such as a source address, destination address, echo request type, request id, packet size, flags, protocol, and other data known in the art. Each of the plurality of received requests can be legitimate requests or malicious requests.

In step 310, the network traffic manager apparatus 14 sends each of the plurality of received requests to a bin of a plurality of bins based on the request id of each of the plurality of received requests. As mentioned above, a bin can be used by the network traffic manager apparatus 14 to sort the plurality of received requests prior to counting each of the received requests in each bin. The network traffic manager apparatus 14 can send each of the plurality of received requests to one of the plurality of bins based on the request id of each of the plurality of received requests. In some examples, a hashing algorithm can be used to sort the plurality of received requests into the plurality of bins as described above. The hashing algorithm can be known algorithms in the art that can iterate through the plurality of received requests based on each of their respective request ids. After the plurality of received requests are sorted into the plurality of bins, the network traffic manager apparatus 14 can determine if one of the plurality of bins contains a plurality of malicious requests.

In step 315, the network traffic manager apparatus 14 determines whether a count of requests in each of the plurality of bins is over a predetermined threshold to identify whether one of the plurality of bins comprise the plurality of malicious requests. If the network traffic manager apparatus 14 determines the count of requests in each of the plurality of bins is over the predetermined threshold, then the Yes branch is taken to step 320. If the network traffic manager apparatus 14 determines the count of requests in each of the plurality of bins is not over the predetermined threshold, then the No branch is taken to step 325. By setting a predetermined threshold and checking whether the count of requests from a source with the same request id is greater than the threshold, the network traffic manager apparatus 14 is able to successfully detect the plurality of malicious requests in the flood attack. The predetermined threshold can be set to different values after comparing the volume of malicious requests used in historical flood attacks. Other methods known in the art can be used to set the predetermined threshold, such as analyzing historical flood attacks and future flood attacks to determine a minimum threshold of malicious requests that malicious actors use to implement the flood attack. Once the bin with the plurality of malicious requests is identified, the network traffic manager apparatus 14 can compare the request id of the request to see if it matches the request ids of the plurality of malicious requests. In some examples, more than one bin of the plurality of bins can comprise of malicious requests if there is a flood attack from multiple sources. Any bins with a count under the predetermined threshold can be determined to comprise of legitimate requests of the plurality of received requests. Any bins with a count over the predetermined threshold can be determined to comprise of malicious requests that should be dropped.

In step 320, if a count of requests in each of the plurality of bins is over the predetermined threshold, the network traffic manager apparatus 14 drops each of the plurality of malicious requests from memory. The network traffic manager apparatus 14 can drop each of the plurality of malicious requests by dropping each bin within the plurality of bins with a count over the predetermined threshold. By eliminating the plurality of malicious requests from being processed and a response being generated for each of the plurality of malicious requests, the flood attack can be effectively mitigated.

In step 325, if count of requests in each of the plurality of bins is not over the predetermined threshold, the network traffic manager apparatus 14 sends each of the requests in each of the bins with a count not over the predetermined threshold to the server 16(1). The network traffic manager apparatus 14 can send each of the legitimate requests to the server 16(1) by sending any requests from bins of the plurality of bins with a count below the predetermined threshold to the server 16(1). The plurality of servers 16(1)-16(n) are required to respond with an echo reply query message according to the requirements for internet hosts ("RFC") 1122. Therefore, each of the legitimate requests of the plurality of received requests is sent to the server 16(1) so that the server 16(1) can generate a response to each of the legitimate requests of the plurality of received requests. The responses can be echo replies or responses. Then in step 330, the network traffic manager apparatus 14 receives the responses from the server 16(1) for each of the legitimate requests of the plurality of received requests.

In step 335, the network traffic manager apparatus 14 sends the responses to each respective source of the legitimate requests and the exemplary process ends at step 340. Each of the responses will comprise of all the data received in the corresponding legitimate request of the plurality of received requests as required by RFC 1122 requirements. Additionally, as mentioned above, the legitimate request of the plurality of received requests each comprise a source address. The network traffic manager apparatus 14 can use each source address in each of the corresponding legitimate requests to send the corresponding response from the server 16(1) to the source. After the source receives each of the responses generated from the server 16(1), the exemplary process ends and any flood attacks of the server 16(1) are successfully mitigated.

By example, the method for detecting a flood attack on a server 16(1) will now be described with reference to FIGS. 4 through 9. First in step 405, the network traffic manager apparatus 14 can receive a plurality of received requests. The plurality of received requests can be echo requests for checking connectivity to the server and each of the plurality of received requests can comprise a request id. As highlighted above in step 205, the plurality of received requests can further comprise data such as a source address, destination address, echo request type, request id, packet size, flags, protocol, and other data known in the art. Each of the plurality of received requests can be legitimate requests or malicious requests.

In step 410, the network traffic manager apparatus 14 can send each of the plurality of received requests to a server 16(1). The plurality of servers 16(1)-16(n) are required to respond with an echo reply query message according to the requirements for internet hosts ("RFC") 1122. Therefore, each of the plurality of received requests have a corresponding response generated by the server 16(1). The server 16(1) can then send a plurality of responses to the network traffic manager apparatus 14. The plurality of responses can comprise of the corresponding response to each of the plurality of received requests generated by the server 16(1). Then in step 415, the network traffic manager apparatus 14 receives the plurality of responses from the server 16(1). The plurality of responses can be echo replies or responses. Each of the plurality of responses can further comprise data such as a source address, destination address, echo request type, request id, packet size, flags, protocol, and other data known in the art. Under the RFC, the echo responses are required to have all of the data of the corresponding echo request. A request id of an echo response can be used to identify the source of the echo request corresponding to the echo response.

In step 420, the network traffic manager apparatus 14 sends each of the plurality of responses to a bin of a plurality of bins based on the request id of each of the plurality of responses. As mentioned above, a bin can be used by the network traffic manager apparatus 14 to sort the plurality of responses prior to counting each of the responses in each bin. The network traffic manager apparatus 14 can send each of the plurality of responses to one of the plurality of bins based on the request id of each of the plurality of responses. In some examples, a hashing algorithm can be used to sort the plurality of responses into the plurality of bins as described above. The hashing algorithm can be known algorithms in the art that can iterate through the plurality of responses based on each of their respective request ids. After the plurality of responses are sorted into the plurality of bins, the network traffic manager apparatus 14 can determine if one of the plurality of bins contains a plurality of responses corresponding to a plurality of malicious requests.

In step 425, the network traffic manager apparatus 14 determines whether a count of responses in each of the plurality of bins is over a predetermined threshold to identify whether one of the plurality of bins comprise responses corresponding to a plurality of malicious requests. If the network traffic manager apparatus 14 determines the count of responses in each of the plurality of bins is over the predetermined threshold, then the Yes branch is taken to step 430. If the network traffic manager apparatus 14 determines the count of responses in each of the plurality of bins is not over the predetermined threshold, then the No branch is taken to step 435. By setting a predetermined threshold and checking whether the count of responses with corresponding requests from a source with the same request id is greater than the threshold, the network traffic manager apparatus 14 is able to successfully detect the request id of the source of a plurality of malicious requests in the flood attack. The predetermined threshold can be set to different values after comparing the volume of malicious requests used in historical flood attacks. Other methods known in the art can be used to set the predetermined threshold, such as analyzing historical flood attacks and future flood attacks to determine a minimum threshold of malicious requests that malicious actors use to implement the flood attack. Once the bin with responses corresponding to the plurality of malicious requests is identified, the network traffic manager apparatus 14 can compare the request id of any subsequent requests to the request id of the responses to the plurality of malicious requests to see if it matches. If the request id matches, the subsequent request should be dropped from memory and is not sent to the server 16(1). In some examples, more than one bin of the plurality of bins can comprise of responses to malicious requests if there is a flood attack from multiple sources. Any bins with a count under the predetermined threshold can be determined to comprise of legitimate responses to legitimate requests of the plurality of received requests. Any bins with a count over the predetermined threshold can be determined to comprise of responses to malicious requests that should be dropped.

In step 430, if a count of responses in each of the plurality of bins is over the predetermined threshold, the network traffic manager apparatus 14 drops each of the plurality of responses in each of the plurality of bins over the predetermined threshold from memory along with the corresponding received request. Additionally, if any subsequent requests are received with the same request id of the responses in each of the plurality of bins over the predetermined threshold, then the subsequent requests can be dropped from memory prior to the subsequent requests being sent to the server 16(1). By eliminating the subsequent requests with the same request id from being processed and a response being generated for each of the subsequent requests with the same request id, the flood attack can be effectively mitigated.

In step 435, if count of responses in each of the plurality of bins is not over the predetermined threshold, the network traffic manager apparatus 14 sends the responses for all of the bins of the plurality of bins with a count under or equal to the predetermined threshold to each respective source of each response and the exemplary process ends at step 440. Then, the exemplary process ends and any flood attacks of the server 16(1) are successfully mitigated.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for detecting a flood attack of a server, the method implemented by a network traffic management system comprising one or more network traffic apparatuses, client devices, or server devices, the method comprising:
   receiving an echo request with a request id for checking connectivity to a server from a source;
   determining whether the request id of the echo request matches a request id of one of a plurality of malicious received requests within a plurality of prior received requests by:
      sorting into groups, with a hashing algorithm, the plurality of prior received requests based on the request id of each of the plurality of prior received requests; and
      determining whether one of the groups comprise malicious requests by verifying if a count of requests in each group is over a predetermined threshold;
   transmitting the echo request to the server when the comparing fails to identify the match; and
   providing an echo response to the echo request received from the server to the source.

2. The method as set forth in claim 1, further comprising:
   dropping the received request when the request id of the echo request matches the request id of one of the plurality of malicious received requests.

3. The method as set forth in claim 1, wherein determining whether the request id of the echo request matches the request id of one of the plurality of malicious received requests within the plurality of prior received requests further comprises:
   sending each of the plurality of prior received requests to one of a plurality of bins based on the request id of each of the plurality of prior received requests; and
   determining whether a count of the plurality of received requests in each of the plurality of bins is over a predetermined threshold, wherein a number of requests with a same request id over the predetermined threshold indicates the requests are malicious.

4. The method as set forth in claim 1, further comprising:
   receiving a plurality of responses, wherein each response of the plurality of responses is received from the server as each of the plurality of prior received requests is transmitted to the server;
   sending each response of the plurality of responses to one of a plurality of bins based on a request id of the response as each response is received by the server; and
   determining whether a count of the plurality of responses in each of the plurality of bins is over a predetermined threshold, wherein a number of responses with a same request id over the predetermined threshold indicates the corresponding prior received requests with the same request id are malicious.

5. A non-transitory computer readable medium having stored thereon instructions for detecting a flood attack of a server comprising executable code which when executed by one or more processors, causes the processors to:
   receive an echo request with a request id for checking connectivity to a server from a source;
   determine whether the request id of the echo request matches a request id of one of a plurality of malicious received requests within a plurality of prior received requests by:
      sorting into groups, with a hashing algorithm, the plurality of prior received requests based on the request id of each of the plurality of prior received requests; and determining whether one of the groups comprise malicious requests by verifying if a count of requests in each group is over a predetermined threshold;
transmit the echo request to the server when the comparing fails to identify the match; and
provide an echo response to the echo request received from the server to the source.

6. The medium as set forth in claim 5, wherein the executable code which when executed by the processors, further causes the processors to drop the received request when the request id of the echo request matches the request id of one of the plurality of malicious received requests.

7. The medium as set forth in claim 5, wherein the executable code which when executed by the processors, further causes the processors to:
send each of the plurality of prior received requests to one of a plurality of bins based on the request id of each of the plurality of prior received requests; and
determine whether a count of the plurality of received requests in each of the plurality of bins is over a predetermined threshold, wherein a number of requests with a same request id over the predetermined threshold indicates the requests are malicious.

8. The medium as set forth in claim 5, wherein the executable code which when executed by the processors, further causes the processors to:
receive a plurality of responses, wherein each response of the plurality of responses is received from the server as each of the plurality of prior received requests is transmitted to the server;
send each response of the plurality of responses to one of a plurality of bins based on a request id of the response as each response is received by the server; and
determine whether a count of the plurality of responses in each of the plurality of bins is over a predetermined threshold, wherein a number of responses with a same request id over the predetermined threshold indicates the corresponding prior received requests with the same request id are malicious.

9. A network traffic manager apparatus, comprising memory comprising programmed instructions stored in the memory and one or more processors configured to be capable of executing the programmed instructions stored in the memory to:
receive an echo request with a request id for checking connectivity to a server from a source;
determine whether the request id of the echo request matches a request id of one of a plurality of malicious received requests within a plurality of prior received requests by:
sorting into groups, with a hashing algorithm, the plurality of prior received requests based on the request id of each of the plurality of prior received requests; and
determining whether one of the groups comprise malicious requests by verifying if a count of requests in each group is over a predetermined threshold;
transmit the echo request to the server when the comparing fails to identify the match; and
provide an echo response to the echo request received from the server to the source.

10. The device as set forth in claim 9, wherein the one or more processors are further configured to be capable of executing the programmed instructions stored in the memory to drop the received request when the request id of the echo request matches the request id of one of the plurality of malicious received requests.

11. The device as set forth in claim 9, wherein the one or more processors are further configured to be capable of executing the programmed instructions stored in the memory to:
send each of the plurality of prior received requests to one of a plurality of bins based on the request id of each of the plurality of prior received requests; and
determine whether a count of the plurality of received requests in each of the plurality of bins is over a predetermined threshold, wherein a number of requests with a same request id over the predetermined threshold indicates the requests are malicious.

12. The device as set forth in claim 9, wherein the one or more processors are further configured to be capable of executing the programmed instructions stored in the memory to:
receive a plurality of responses, wherein each response of the plurality of responses is received from the server as each of the plurality of prior received requests is transmitted to the server;
send each response of the plurality of responses to one of a plurality of bins based on a request id of the response as each response is received by the server; and
determine whether a count of the plurality of responses in each of the plurality of bins is over a predetermined threshold, wherein a number of responses with a same request id over the predetermined threshold indicates the corresponding prior received requests with the same request id are malicious.

13. A network traffic management system, comprising one or more traffic management apparatuses, client devices, or server devices, the network traffic management system comprising memory comprising programmed instructions stored thereon and one or more processors configured to be capable of executing the stored programmed instructions to:
receive an echo request with a request id for checking connectivity to a server from a source;
determine whether the request id of the echo request matches a request id of one of a plurality of malicious received requests within a plurality of prior received requests by:
sorting into groups, with a hashing algorithm, the plurality of prior received requests based on the request id of each of the plurality of prior received requests; and
determining whether one of the groups comprise malicious requests by verifying if a count of requests in each group is over a predetermined threshold;
transmit the echo request to the server when the comparing fails to identify the match; and
provide an echo response to the echo request received from the server to the source.

14. The network traffic management system of claim 13, wherein the one or more processors are further configured to be capable of executing the programmed instructions stored in the memory to drop the received request when the request id of the echo request matches the request id of one of the plurality of malicious received requests.

15. The network traffic management system of claim 13, wherein the one or more processors are further configured to be capable of executing the programmed instructions stored in the memory to:
send each of the plurality of prior received requests to one of a plurality of bins based on the request id of each of the plurality of prior received requests; and
determine whether a count of the plurality of received requests in each of the plurality of bins is over a predetermined threshold, wherein a number of requests with a same request id over the predetermined threshold indicates the requests are malicious.

16. The network traffic management system of claim 13, wherein the one or more processors are further configured to be capable of executing the programmed instructions stored in the memory to:
receive a plurality of responses, wherein each response of the plurality of responses is received from the server as each of the plurality of prior received requests is transmitted to the server;
send each response of the plurality of responses to one of a plurality of bins based on a request id of the response as each response is received by the server; and
determine whether a count of the plurality of responses in each of the plurality of bins is over a predetermined threshold, wherein a number of responses with a same request id over the predetermined threshold indicates the corresponding prior received requests with the same request id are malicious.

* * * * *